Patented June 2, 1931

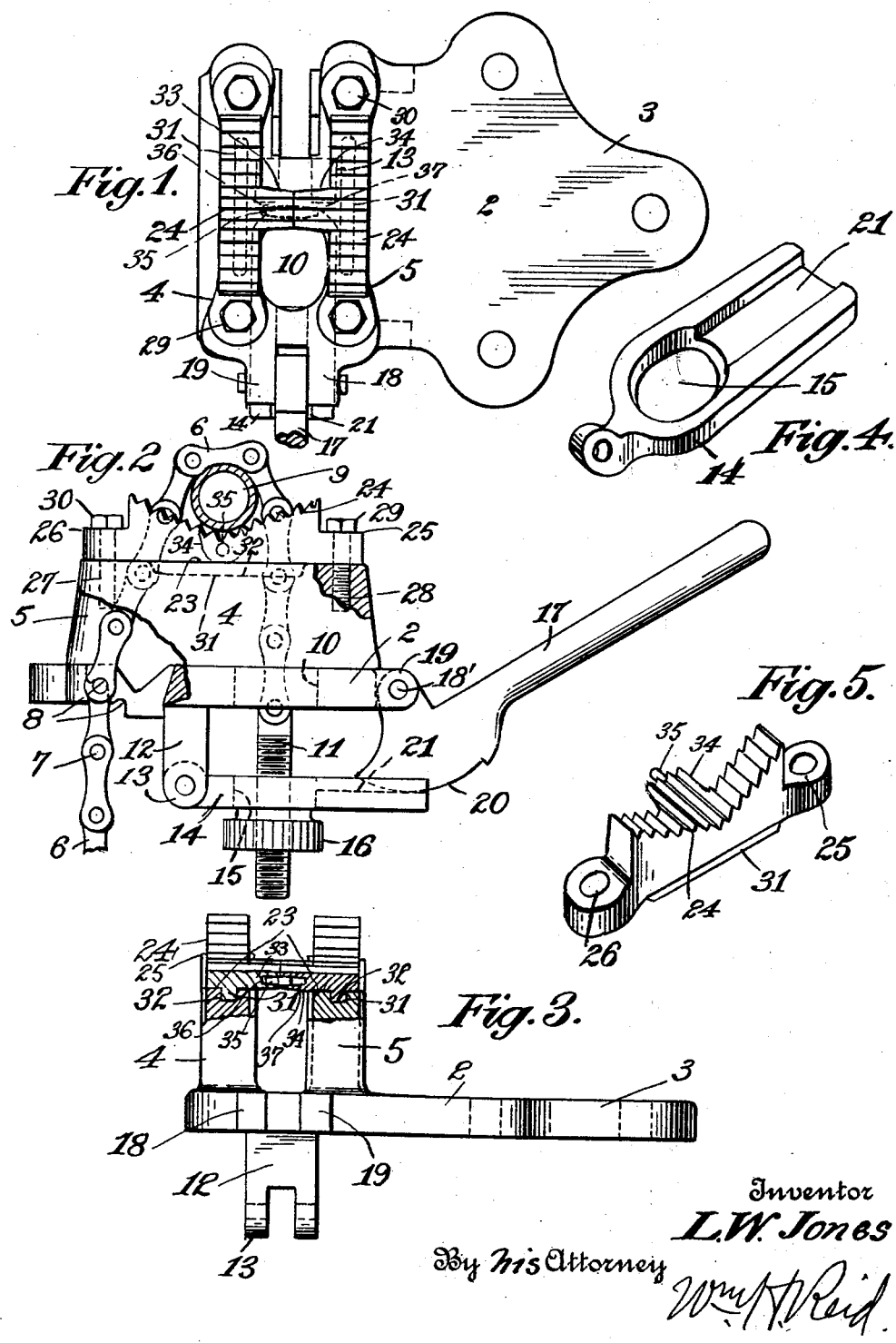

1,807,917

UNITED STATES PATENT OFFICE

LOUIS W. JONES, OF NEW YORK, N. Y., ASSIGNOR TO HOLLANDS MANUFACTURING COMPANY, OF ERIE, PENNSYLVANIA, A CORPORATION OF PENNSYLVANIA

CHAIN PIPE VISE

Application filed October 23, 1929. Serial No. 401,937.

This invention has reference to a machine tool or implement, generally known as a pipe vise, and has for its object to provide a structure in which a pipe or similar round article can be quickly and rigidly clamped between a jaw member and a binding member preferably in the form of a chain; and which structure provides means for very quickly producing the clamping action on the pipe, and which furthermore will provide a very rapid release of the clamping member, and with the expenditure of comparatively little power.

A further object of the invention is to provide in a device of this kind a special acting lever control, in connection with a quick form of initial adjustment, whereby the strong and rigid clamping action will take effect by the mere swinging of a handle lever; and wherein also the mere swinging back of this handle lever, with a small amount of force exerted, will at once release the pipe or other article.

A further object of the invention is to provide the jaw member with a detachable top piece or plate, that is usually of angular form, and provided with teeth or sharp ribs to grip the pipe; whereby this portion can be readily removed and another substituted, by simple securing or clamping means, such as a pair of bolts.

In the accompanying drawings showing embodiments of my invention:

Fig. 1 is a plan view.

Fig. 2 is a side elevation, partly in section.

Fig. 3 is an elevation of the base and standards.

Fig. 4 shows the swinging lever.

Fig. 5 shows one of the jaw pieces detached.

As shown in the drawings, the device comprises a base 2 having an apertured extension 3 with holes for bolting to a suitable table or support. On the base are mounted a pair of standards 4 and 5 that are spaced apart to permit a chain 6 to pass freely between them. At the rear this chain has its pins 7 arranged to engage opposite notch portions 8, and the chain passes upward over a pipe 9 that rests on the top portions of the two standards 4 and 5, the chain then passing downwardly through a hole 10 in the base, its lower end being provided with a bolt 11.

On the bottom of the base is a hinge bracket 12 with its lower end slotted to form apertured ears 13, between which is pivoted a lever 14, see Fig. 4. The bolt 11 projects through a large opening 15 in this lever, and carries a nut 16, at its lower end that when screwed upward will engage the lever on its lower face.

A handle lever 17 is pivoted between ears 18 and 19 on the base 2, and is provided with a cam portion 20, made eccentric to the pivot axis 18'. When the lever is swung downward the cam will ride in a channel portion 21 in the lever 14. This cam will force the lever downward, and since the chain bolt passing through the lever will engage its lower face by the nut, the chain will be drawn downward at this portion.

In the use of the device, the handle is swung to upright position, and the chain caused to engage by its pins the hook portion 8, after being passed around the pipe 9, as indicated in Fig. 2. Thereupon the nut 16 is screwed up to give a slight pressure or tension on the pipe and chain, and then the handle 17 is forced downwardly, and the cam will ride on the lever 14 and draw it down under considerable pressure, and securely bind the pipe on the upper jaw portion of the two standards.

It has been found with the use of devices of this character, that the tooth engaging faces of the two standards become worn and defaced by engagement with the pipes, since the pipes are subjected to the turning action by thread cutting tools. Where the standards have the toothed top portions made integral with their structure, it is necessary to provide an entire new standard and base member, involving considerable expense, as well as the operation of moving the lever and the handle bar.

In the present invention I provide each standard with a detachable top piece or member, that when it becomes worn or defaced, can be quickly and easily removed, and another piece substituted therefor. As shown in the drawings each standard has a flat upper face 23, adapted to receive a jaw piece 24, shown separately in Fig. 5. This jaw piece has the upper face made angular and provided with cross teeth as shown. At each end of this piece are ears 25, 26 with suitable bolt holes; and the standards 4 and 5 are provided with bores that are screw threaded and register with the holes on the ears. Suitable bolts 29 and 30 are passed down through the ears of the jaw pieces and are screwed into the threaded holes on the standards. Each jaw piece 24, is shown provided with a rib 31 along the lower face; and each standard 4 and 5, has a slot 32 in the upper face into which the rib projects, to position the jaw piece and prevent side movement and lateral strain on the bolts.

The two jaw top pieces 24, are provided with extensions, 33, 34, at the middle angular portion, which project toward each other, and are provided with teeth forming extensions of the teeth on the central main portions. If desired these extensions can meet, and may be provided with interlocking portions or means. As shown, a pin 35 tapered towards the ends, extends into sockets 36, 37, in the extensions 33, 34. This will reinforce the jaw members and brace them against undue strain and wear. Also, where small pipe is clamped in the vise by the chain, the pipe will be supported by these extensions on the portion opposite that engaged by the chain, that might otherwise bend the pipe down between the jaws, where they separated as in the usual manner or arrangement; and the pin will strengthen the extensions and hold them in alinement.

It will be readily understood that should either of these top pieces become worn or damaged, it is only necessary to take out the two bolts, and replace the jaw piece by another similar member, and the same bolts returned and screwed down. Obviously, these jaw pieces make a great saving in the expense for replacement where the jaw becomes unfit for proper use.

While I have described one embodiment of my invention, it can be altered in form, arrangement, relation and construction of parts, and modification can be made within the purview of the invention and within the scope of the claims, without departing from the spirit and import of the invention.

What I claim is:—

1. In a chain pipe vise, base plate and a pair of standards spaced apart on the base, each standard having the upper wall provided with a threaded hole in each end portion and a slot between the holes, and a jaw piece fitting the upper wall of each standard with a bolt hole in each end portion to receive bolts that screw down into said bolt holes in the standards to secure the jaws on the standards removable for replacement, the jaw piece having a rib on the bottom face fitting the said slot between the holes in the standard upper face, the upper face of each jaw being of angular form with cross teeth to grip the pipe.

2. In a chain pipe vise, a base plate and a pair of jaws supported above the base each having an angular top face with cross teeth, each jaw having a toothed extension at the middle angular portion said extensions being arranged to project into engagement with each other and being provided with interlocking portions.

3. In a chain pipe vise, a base plate, and a pair of standards spaced apart on the base, each standard being provided with a detachable top jaw piece having an angular upper face with cross teeth to grip the pipe, each jaw piece having a toothed extension at the middle angular portion which projects towards the other extension, and a dowel pin connecting said extensions.

4. In a chain pipe vise, a base plate, and a pair of standards on the base, each standard being provided with a detachable top jaw piece having an angular upper face with cross teeth to grip the pipe, each jaw piece having a toothed extension at the middle angular portion that projects into engagement with each other and are provided with interlocking portions.

Signed at New York city, N. Y., October 10, 1929.

LOUIS W. JONES.